M. LENTI.
GAGE.
APPLICATION FILED MAR. 8, 1918.

1,329,911.

Patented Feb. 3, 1920.

INVENTOR
Mario Lenti
BY
H. W. Plucker
ATTORNEY

UNITED STATES PATENT OFFICE.

MARIO LENTI, OF MILAN, ITALY.

GAGE.

1,329,911.  Specification of Letters Patent.  Patented Feb. 3, 1920.

Application filed March 8, 1918. Serial No. 221,273.

*To all whom it may concern:*

Be it known that I, MARIO LENTI, a subject of the King of Italy, resident of Milan, in the Kingdom of Italy, N. 15 Via Galvani, have invented new and useful Improvements in or Relating to Gages, of which the following is a specification.

This invention relates to gages having means for measuring the thickness or the diameter of bodies and means for measuring the depth of holes, recesses and the like or the difference in level between two surfaces. One object of this invention is to provide an improved gage of this character in which the thickness and depth measurements can be read on a single scale. Another object is to provide means whereby the movable parts of the gage are firmly guided by the fixed or stationary parts, whatever be their relative position. A further object is to provide means for correcting and compensating any defect in the proper contact between the fixed and movable parts of the gage.

With these and other objects in view, which will be apparent from the following description of an embodiment of the improved gage, my invention consists in the novel parts, constructions, arrangements and combinations herein shown and described and more particularly pointed out in the claims.

Referring to the drawings which illustrate the preferred embodiment of my invention:

Figure 2:
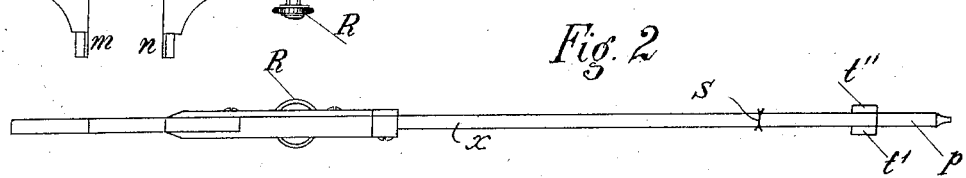
Fig. 2 is a side elevation.

The gage illustrated in the drawings consists of a fixed part comprising a cross-head M and a graduated bar or scale B integral therewith and provided with a longitudinal slot $f$ cut through the full thickness $s$ (Fig. 2) of the bar and extending along its whole length or practically so; and a movable part or slide comprising a cross-head N rigidly connected to a frame $a$ and to a rod $p$ which is slidably fitted in the slot $f$.

Figure 3:
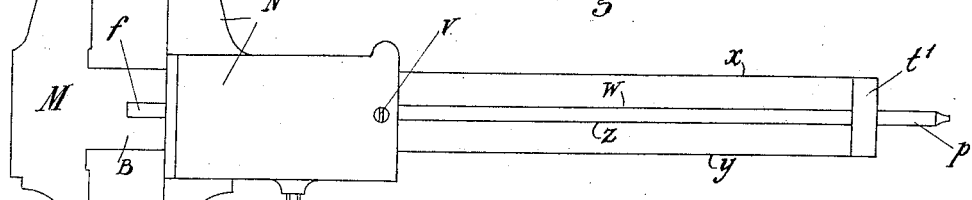
Fig. 3 is a rear view of the gage.
Figure 1:
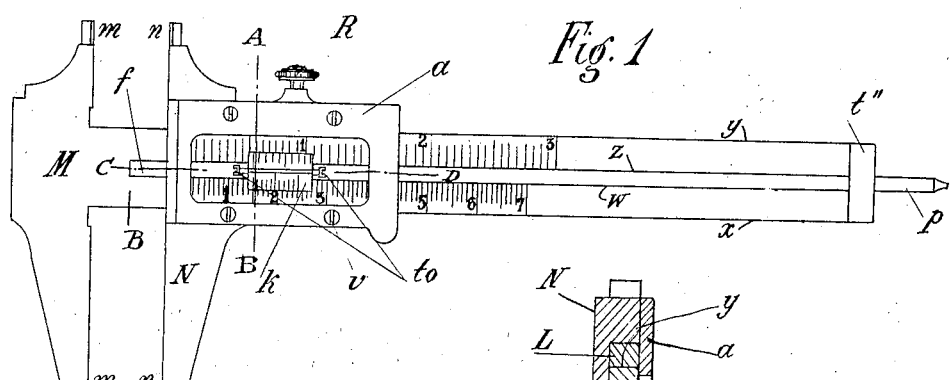
Figure 1 is a front view of the gage.

The cross-head N is herein shown to be secured to the frame $a$ by means of screws $v$ (Fig. 1) and to the rod $p$ by means of a screw V (Fig. 3). The slot $f$ extends from a point near the cross-head M to the opposite end of bar B, where the portions of the bar on either side of the slot $f$ are connected by two cross-pieces $t'$ and $t''$ which coöperate with the walls of the slot in guiding the rod $p$. A thumb screw R threaded through the cross-head N and adapted to engage a clamping member L carried within the slide (Fig. 4) permits of locking the slide N, $a$, $p$ at any required position on the rule B.

Figure 5:
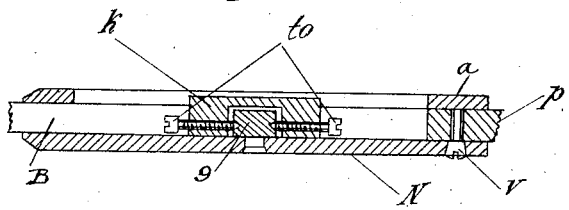
Figs. 4 and 5 are cross-sections on lines A—B and C—D respectively, of Fig. 1.
Figure 4:
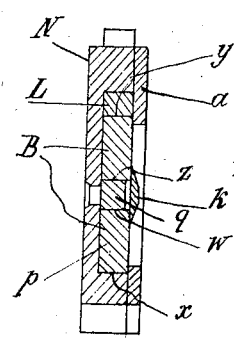

The cross-head N also carries a vernier $k$ which preferably, is adjustably secured thereto. As illustrated in Fig. 5, two screws $t_o$, $t_o$ are threaded through the vernier $k$ and bear against a block or projection $q$ on the frame $a$. This block or projection $q$ fits in the slot $f$ in bar B, as best shown in Fig. 4. By simultaneously turning the screws $t_o$, $t_o$ in opposite directions the vernier $k$ may be displaced to the desired extent with respect to the frame $a$.

When the instrument is not in use the cross-head N is brought into contact with the cross-head M, the zero of the graduation on the vernier $k$ then being coincident with the zero on the scale or bar B, and the outer end of the rod $p$ being flush with the slotted end of bar B. In use the two cross-heads are moved apart and the body of which the thickness is to be measured is introduced therebetween, or if it be desired to measure a difference in level between two surfaces, the slotted end of bar B is placed on one of the surfaces and the cross-head N moved outwardly until the end of rod $p$ engages the other surface. In either case the desired measurement is indicated by the position of the vernier relatively to the scale.

The adjustable connection between the vernier $k$ and the slide permits of correcting any imperfection in the proper engagement of the contact surfaces $m$, $m$ and $n$, $n$ on the cross-heads M and N respectively, due to wear or other causes. Whenever required, the proper contact between $m$, $m$ and $n$, $n$ may be restored by filing the adjacent surfaces of the cross-heads M and N, but this brings the zero on the vernier out of register with the zero on the graduated bar B. By turning the screws $t_o$, $t_o$ as described above the vernier $k$ may be adjusted so that the zero of its graduation will again register with the zero on the fixed scale.

It will be noted that the movable part of the device comprising the cross-head N, frame $a$ and rod $p$, is guided in its movements along the bar B by four parallel surfaces, *i. e.* the sides $x$ and $y$ of the bar B which are engaged by the cross-head N and the sides or walls $w$ and $z$ of the slot $f$ which are engaged by the rod $p$. The cross-bars $t'$, $t''$ provide an additional guiding means for the rod $p$. This arrangement is both simple and efficient, and it minimizes the risk of errors due to looseness or imperfect engagement of the parts, which is a distinct advantage over sliding gauges which are guided merely by the outer sides of the scales.

It will be readily understood that various changes may be made in the construction and shape of the gage described without departing from the scope of my invention, as set forth in the appended claims.

I claim:

1. A gage for thickness and depth measurements, comprising a graduated bar, a cross-head integral therewith, said bar having a longitudinal slot extending to one end thereof, a cross-head slidably mounted on said bar, a vernier carried by the slidable cross-head, and a rod secured to said slidable cross-head and slidably mounted in said slot.

2. A gage for thickness and depth measurements, comprising a graduated bar, a cross-head integral therewith, said bar having a longitudinal slot cut through its full thickness and extending from said cross-head to the opposite end of said bar, a cross-head slidably mounted on said bar, a vernier carried by the slidable cross-head, a rod rigidly connected to the slidable cross-head, said rod being snugly fitted and adapted to slide in said slot, and cross-pieces connecting the end portions of said bar on both sides of said slot.

3. A gage for thickness and depth measurements comprising a graduated bar, a cross-head integral therewith, said bar having a longitudinal slot extending to one end thereof, a cross-head slidably mounted on said bar, a vernier carried by the slidable cross-head, means for adjusting said vernier in position with respect to said slidable cross-head, and a rod secured to said slidable cross-head and slidably mounted in said slot.

4. A gage for thickness and depth measurements, comprising a longitudinally slotted fixed part including a cross-head and a scale, and a slidable part including a cross-head, a vernier and a rod, said scale having a pair of guiding surfaces in engagement with said slidable cross-head and the longitudinal slot having a pair of guiding surfaces in engagement with said rod.

5. A gage for thickness and depth measurements, comprising a graduated bar, a cross-head integral therewith, said bar having a longitudinal slot extending to one end thereof, a slide comprising a cross-head, a frame and a rod, said cross-head and frame engaging the sides of said bar, said rod engaging the walls of said slot, a projection on said cross-head extending through said slot, and a vernier adjustably secured to said projection.

MARIO LENTI.